United States Patent [19]
Mizumoto

[11] Patent Number: 5,881,328
[45] Date of Patent: Mar. 9, 1999

[54] BAND-PASS FILTER FOR A PULSE POSITION MODULATION SIGNAL

[75] Inventor: Kenji Mizumoto, Osaka, Japan

[73] Assignee: Minolta Co., Ltd., Osaka, Japan

[21] Appl. No.: 662,520

[22] Filed: Jun. 13, 1996

[30] Foreign Application Priority Data

Jun. 15, 1995 [JP] Japan .................................. 7-149005

[51] Int. Cl.⁶ .................................................. G03B 1/00
[52] U.S. Cl. ............................................ 396/319; 360/25
[58] Field of Search ................................ 396/319; 360/25

[56] References Cited

U.S. PATENT DOCUMENTS

| | | | |
|---|---|---|---|
| 5,093,751 | 3/1992 | Yuki et al. | 360/25 |
| 5,130,728 | 7/1992 | Goto et al. | 396/319 |
| 5,302,986 | 4/1994 | Kazami | 396/319 |
| 5,506,644 | 4/1996 | Suzuki et al. | 396/319 |
| 5,519,462 | 5/1996 | Spencer et al. | 396/319 |
| 5,640,629 | 6/1997 | Hibino et al. | 396/319 |
| 5,649,249 | 7/1997 | Yoshida | 396/319 |
| 5,664,246 | 9/1997 | Ishihara et al. | 396/319 |

*Primary Examiner*—Russell Adams
*Attorney, Agent, or Firm*—Burns, Doane, Swecker & Mathis, LLP

[57] ABSTRACT

A filtering system for use with a reader for reading pulse position modulation (PPM) binary data recorded on a record medium in a relative movement to the record medium, the filtering system includes a filter which filters PPM binary data; a detector which detects a relative movement speed between the reader and the record medium; and a setter which sets a band cutoff frequency of the filter in accordance with a detected relative movement speed and a data recording density.

33 Claims, 14 Drawing Sheets

PPM SIGNAL $V_{RB}$ SIGNAL

DIFFERENTIAL SIGNAL OF $V_{RB}$

SHAPED SIGNAL OF DIFFERENTIAL SIGNAL

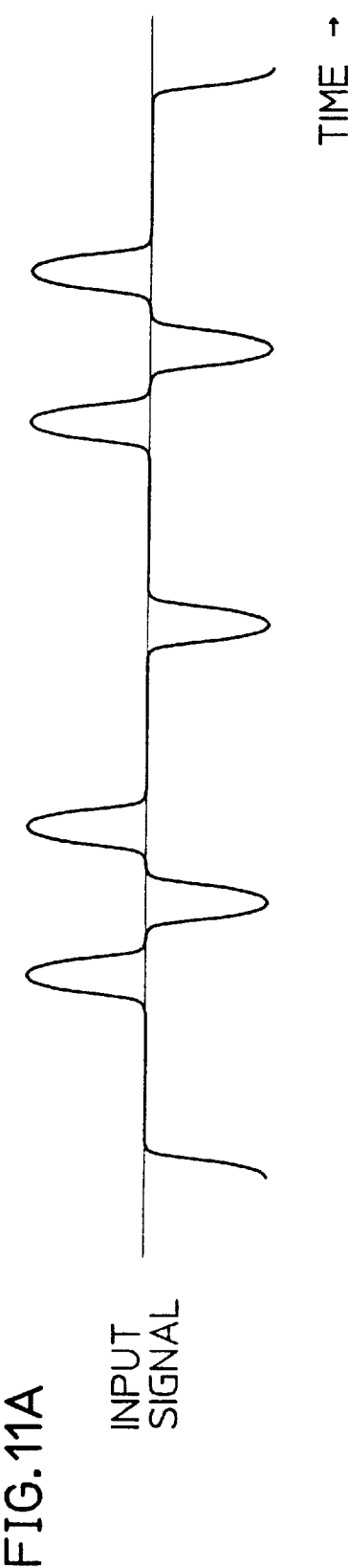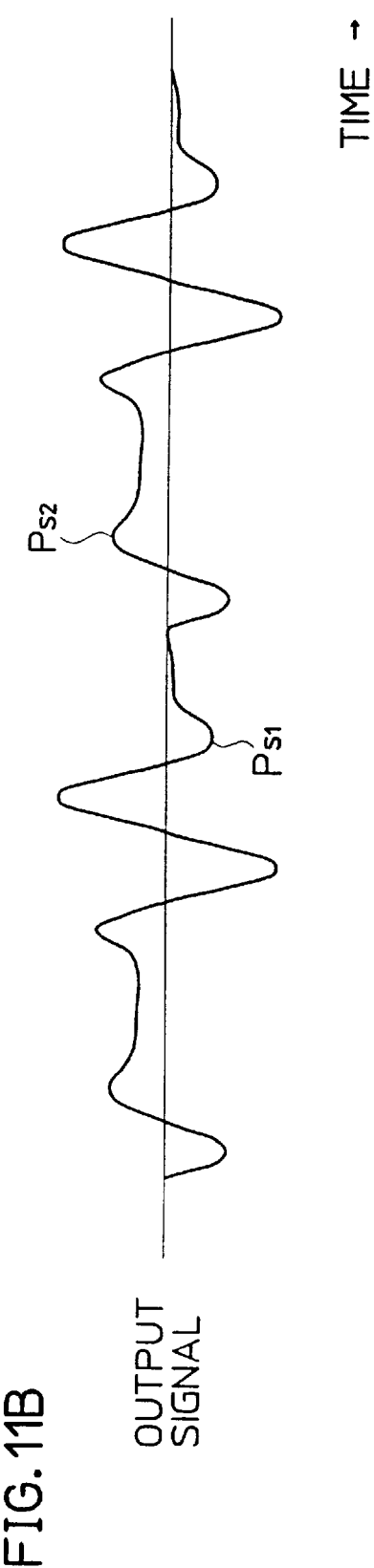

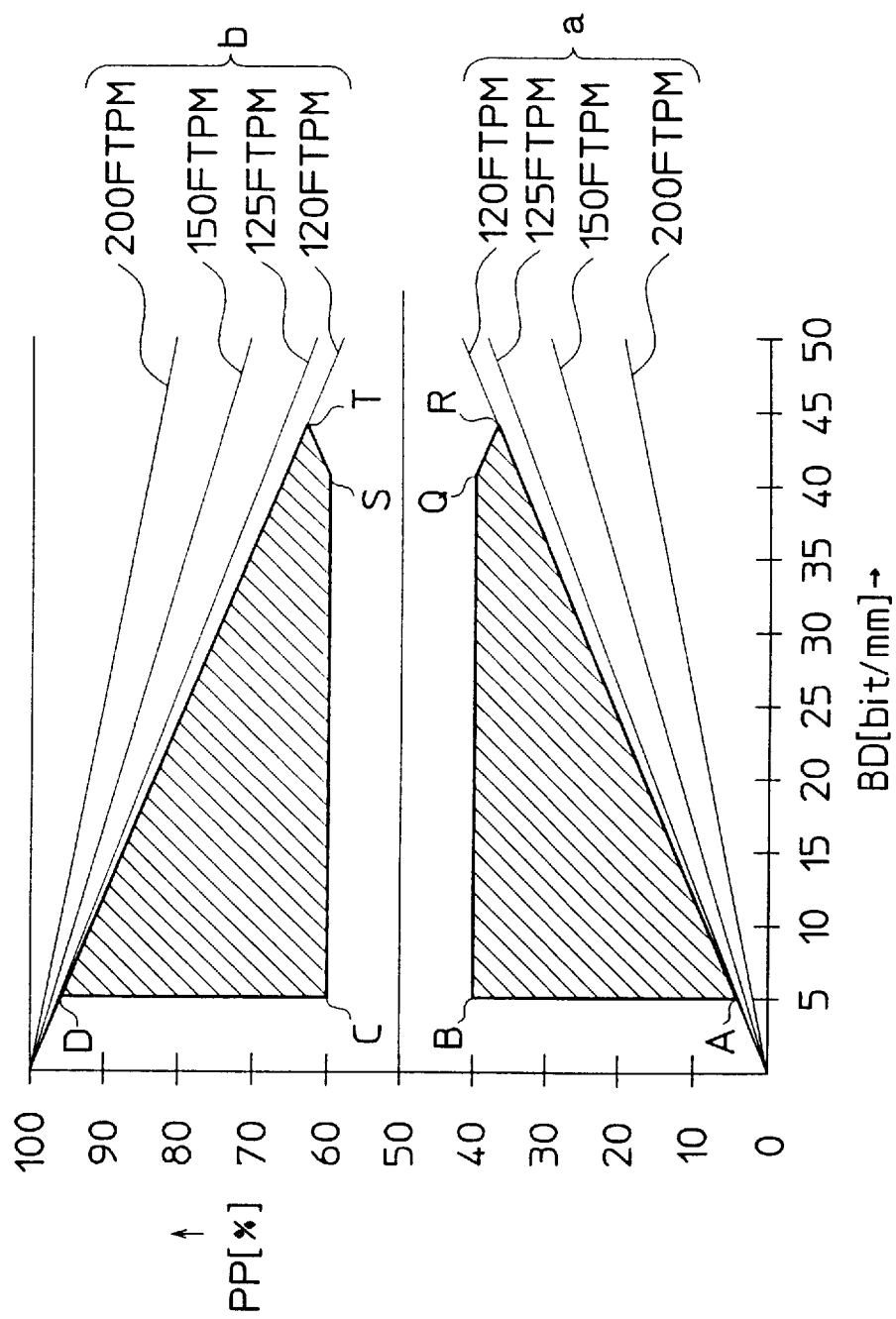

BAND-PASS FILTER FOR A PULSE POSITION MODULATION SIGNAL

BACKGROUND OF THE INVENTION

This invention relates to a band-pass filter for removing noise from PPM (Pulse Position Modulation) binary signal read from a record medium by a reader and a device provided with such a band-pass filter, particularly to a band-pass filter for a PPM signal having suitably set low and high band cutoff frequencies which determine filtration characteristics.

A band-pass filter has been adopted in a measuring equipment and a signal processing device so as to extract, from a signal from a signal source or a signal input device, only components lying within a specified frequency band. Adoption of such a filter enables production of highly reliable equipments and devices by removing unnecessary frequency component noises.

In recent years, there have been provided silver-halide films having magnetic tracks formed by applying magnetic powder in the form of a strip such that they correspond to image recording areas of respective frames. On the other hand, a camera is known which includes a built-in recording head for recording necessary exposure data which were converted into binary data according to a PPM system along the magnetic track. Further, a camera and a film image reproducing apparatus are known which use the exposure data recorded during the photographing operation if necessary. Such exposure data are used to discriminate exposed and unexposed frames against each other when a film in a cartridge which was rewound after being used halfway is wound to a first unexposed frame. In a film image reproducing apparatus or the like for optically reading a film image to reproduce it on a monitor, the exposure data may be read while the film image is read from the exposed film set in a film feeder and used to determine a suitable reproduction method of the read film image (e.g. vertical/horizontal conversion, zooming, panning, etc.).

In the existing equipments and devices, the cutoff frequencies of the filter are generally set only considering the frequency components of the input signal which are to be extracted.

Since the exposure data are written or read while the film is being fed in the existing camera and film image reproducing apparatus, the cycle and phase of the binary signal may not always be stable as in the existing equipments and devices. Accordingly, there is a possibility that the filtration characteristics set only considering the frequency components of the input signal to be extracted deter a preferable signal extraction during the data presence discrimination or the reproduction of the data content. Particularly, the influence of such filtration characteristics is eminent in the case that the exposure data influence their frequency components depending upon their writing and reading speed.

SUMMARY OF THE INVENTION

It is an object of the present invention to provide a band-pass filter which has overcome the problems residing in the prior art.

It is another object of the present invention to provide a bandpass filter for a PPM signal which can ensure a reliable signal discrimination and reproduction of a recorded signal.

According to the present invention, a filter is adapted for use with a reader for reading pulse position modulation binary data recorded on a record medium in a relative movement to the record medium. The filter is provided with a band cutoff frequency changeable in accordance with a recording density of data on the record medium and a relative movement speed between the reader and the record medium.

The band cutoff frequency may have a low band cutoff frequency which is defined based on a product of a minimum data recording density and a minimum relative movement speed. Also, the band cutoff frequency may have a high band cutoff frequency which is defined based on a product of a maximum data recording density and a maximum relative movement speed. Further, the band cutoff frequency may have a low band cutoff frequency which is defined based on a product of a minimum data recording density and a minimum relative movement speed, and a high band cutoff frequency which is defined based on a product of a maximum data recording density and a maximum relative movement speed. Furthermore, the band cutoff frequency may have a band cutoff frequency falling within a range of $\pm\frac{1}{3}$ octave of a product of a data recording density and a relative movement speed.

The band cutoff frequency may be preferable to be changeable in accordance with a variation range of recording density of data on the record medium and a variation range of relative movement speed between the reader and the record medium.

Also, a filter of the present invention is provided with a band cutoff frequency changeable in accordance with a relative movement speed between the reader and the record medium when executing the reading and one of a recording density of data on the record medium and a magnetization reversion density.

The band cutoff frequency may have a high band cutoff frequency which is defined based on a product of a maximum magnetization reversion density and a maximum relative movement speed. Also, the band cutoff frequency may have a high band cutoff frequency which is defined based on one half of a product of a maximum magnetization reversion density and a maximum relative movement speed. Further, the band cutoff frequency may have a low band cutoff frequency which is defined based on a product of a minimum data recording density and a minimum relative movement speed, and a high band cutoff frequency which is defined based on a product of a maximum magnetization reversion density and a maximum relative movement speed.

According to the present invention, further, a filtering system is adapted for use with a reader for reading pulse position modulation binary data recorded on a record medium in a relative movement to the record medium. The filtering system comprises: a filter which filters pulse position modulation binary data; a detector which detects a relative movement speed between the reader and the record medium; and a setter which sets a band cutoff frequency of the filter in accordance with a detected relative movement speed.

Furthermore, the present invention is directed to a filter for use with a reader for reading pulse position modulation binary data recorded on a record medium in a relative movement to the record medium in a location near a television having a specified horizontal synchronization frequency, the filter having a high band cutoff frequency lower than the specified horizontal synchronization frequency. The high band cutoff frequency may be preferable to be higher than one half of a product of a maximum magnetization reversion density and a maximum relative movement speed.

Moreover, the present invention is directed to a device capable of reading pulse position modulation binary data recorded on a record medium, the device comprising: a reading head which reads recorded data to produce a read signal; a driver which causes a relative movement between the record medium and the reading head; a filtering circuit which filters a signal having a specified band frequency from the read signal; and a controller which sets a band cutoff frequency of the filtering circuit based on a recording density of data on the record medium and a relative movement speed between the record medium and the reading head.

The record medium may be a photographic film having a magnetic recording portion. It may be appreciated that the device is a camera or an image reproducing apparatus.

A filter of the present invention, as mentioned above, is provided with a band cutoff frequency changeable in accordance with a recording density of data on the record medium or a magnetization reversion density of the record medium, and a relative movement speed between the reader and the record medium. Accordingly, the band cutoff frequency can be suitably set in consideration of a phase variation of the recorded signal when a PPM binary signal is written in a record medium and a reading speed variation. This will ensure a reliable signal discrimination and reproduction of a recorded signal.

Also, the low and high band cutoff frequencies are set based on maximum and minimum values of the data recording density and relative reading speed without considering the presence of a distortion of a read signal and only on the basis of a readable frequency range as much as possible. Accordingly, there can be provided a band-pass filter for a PPM signal which has an improved durability against noises and a high S/N ratio.

Further, the low and high band cutoff frequencies are set based on a minimum value of the data recording density, a maximum value of the magnetization reversion density, and a maximum and minimum values of the relative reading speed on the basis of the fact that the distortion of a read signal does not occur. Accordingly, there can be provided a band-pass filter for a PPM signal which has an improved durability against noises and a high S/N ratio, and ensures reproduction of a read signal.

These and other objects, features and advantages of the present invention will become more apparent upon a reading of the following detailed description and accompanying drawings.

BRIEF DESCRIPTION OF THE DRAWINGS

FIGS. 11A and 11B are waveform charts showing generation of pseudo peaks by filtering, FIG. 11A showing a signal and FIG. 11B showing a waveform of the signal after filtering;

FIG. 12 is a graph showing an example of standards of a recording density and pulse positions of bit cells recorded on a magnetic track;

DETAILED DESCRIPTION OF THE PREFERRED EMBODIMENTS OF THE INVENTION

A band-pass filter of the present invention is applicable for a variety of devices and apparatus. However, the following description will be made about an embodiment using an inventive band-pass filter in a data reader to be provided in a camera capable of magnetically writing photographic data on a film and a film image reproducing apparatus capable of reading out photographic data from the film.

Figure 1:
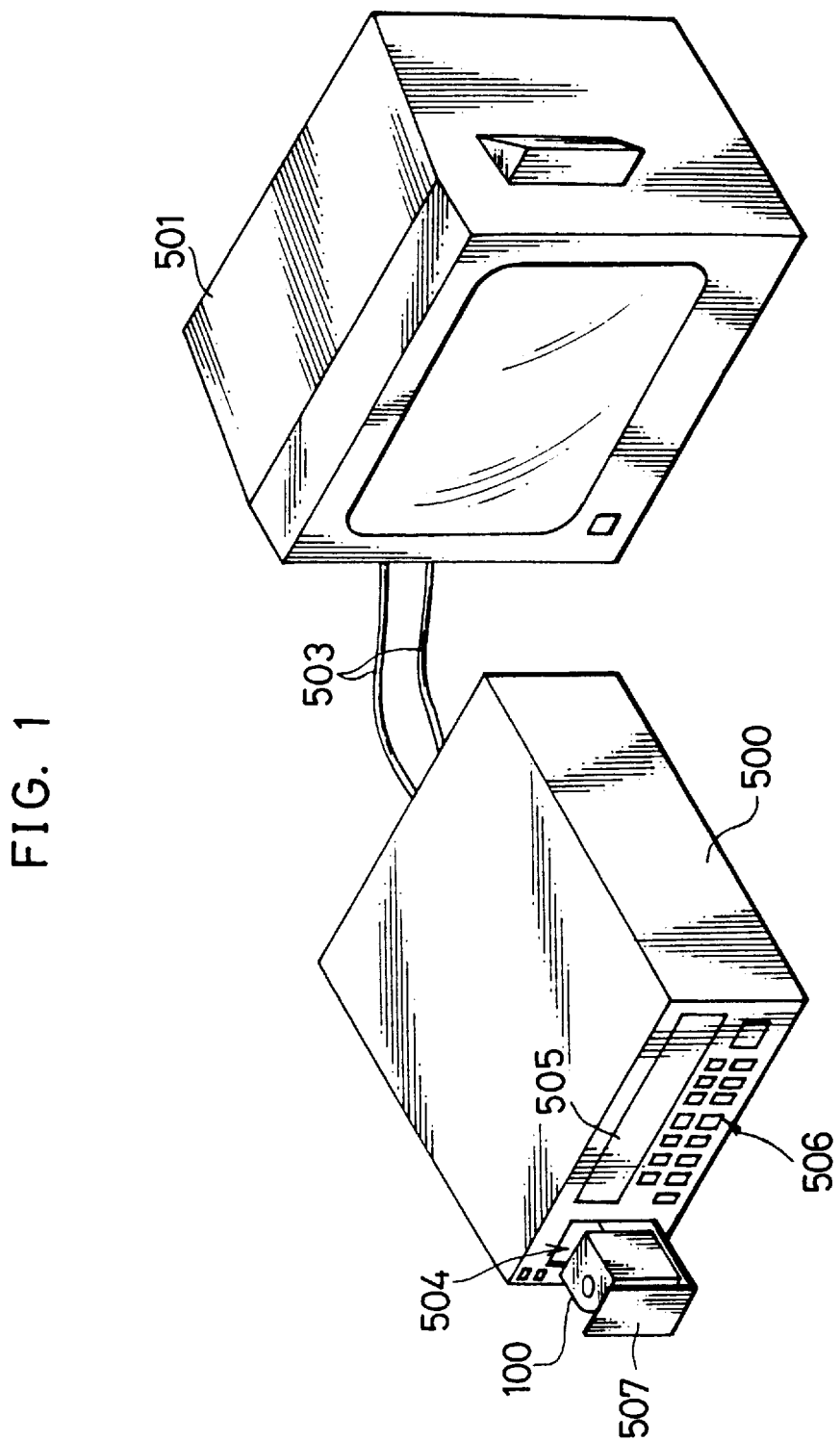
FIG. 1 is a perspective view of a film image reproducing apparatus provided with a data reader including a band-pass filter embodying the present invention.

FIG. 1 shows a film image reproducing apparatus 500 provided with a data reader including an inventive band-pass filter. A primary function of a film image reproducing apparatus 500 is to pick up images recorded in individual frames of a film F which is carried by a film cartridge 100, and reproduce images on a screen of a TV monitor 501 which is connected with the film image reproducing apparatus 500 by cables 503. A front panel of the apparatus 500 is broadly divided into a cartridge insertion/withdrawal section 504, a display section 505, and a control section 506. A cartridge table 507 is slidably provided in the cartridge insertion/withdrawal section 504. The film cartridge 100 is loaded and unloaded in the apparatus 500 by sliding the cartridge table 507.

Figure 2:
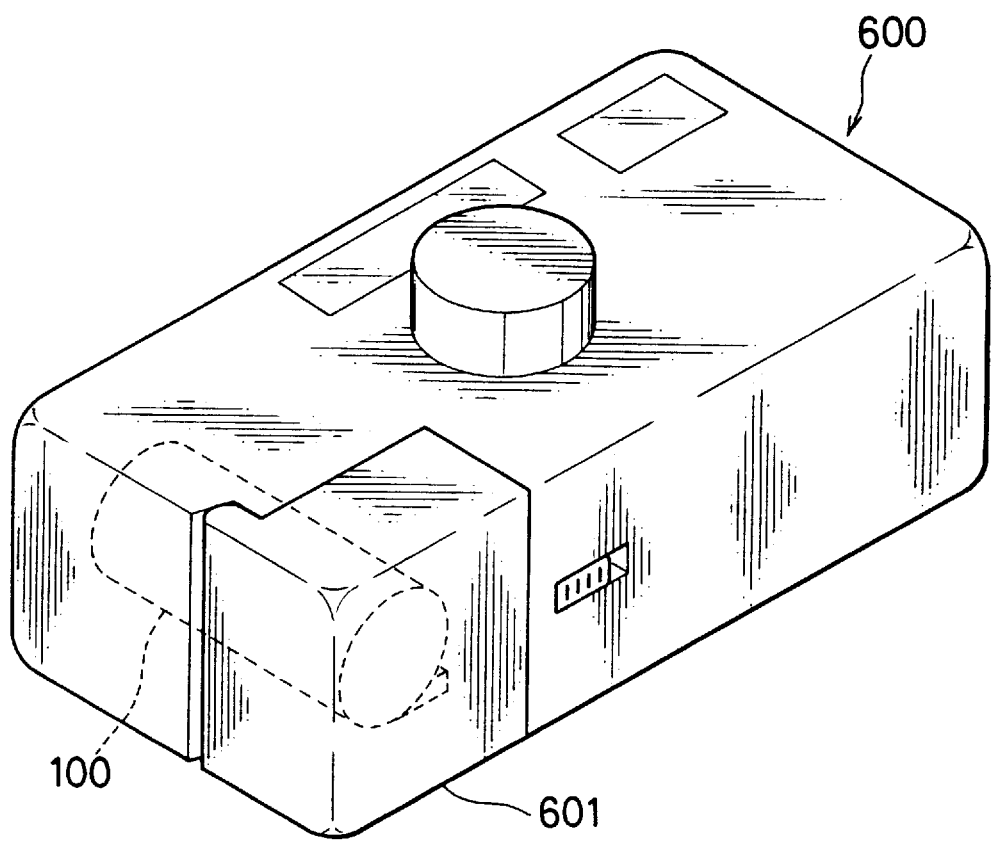
FIG. 2 is a perspective view of a camera provided with a data reader including a band-pass filter embodying the present invention.

FIG. 2 shows a camera provided with a data reader including an inventive band-pass filter. A camera 600 is provided with an openable cartridge locking member 601 in a bottom portion thereof. A film cartridge 100 is loaded in the camera 600 by opening the locking member 601, inserting the film cartridge 100 into the camera, and closing the locking member 601. A film cartridge 100 is unloaded from the camera 600 by opening the locking member 601 and withdrawing the film cartridge 100 from the camera 600.

Figure 3:
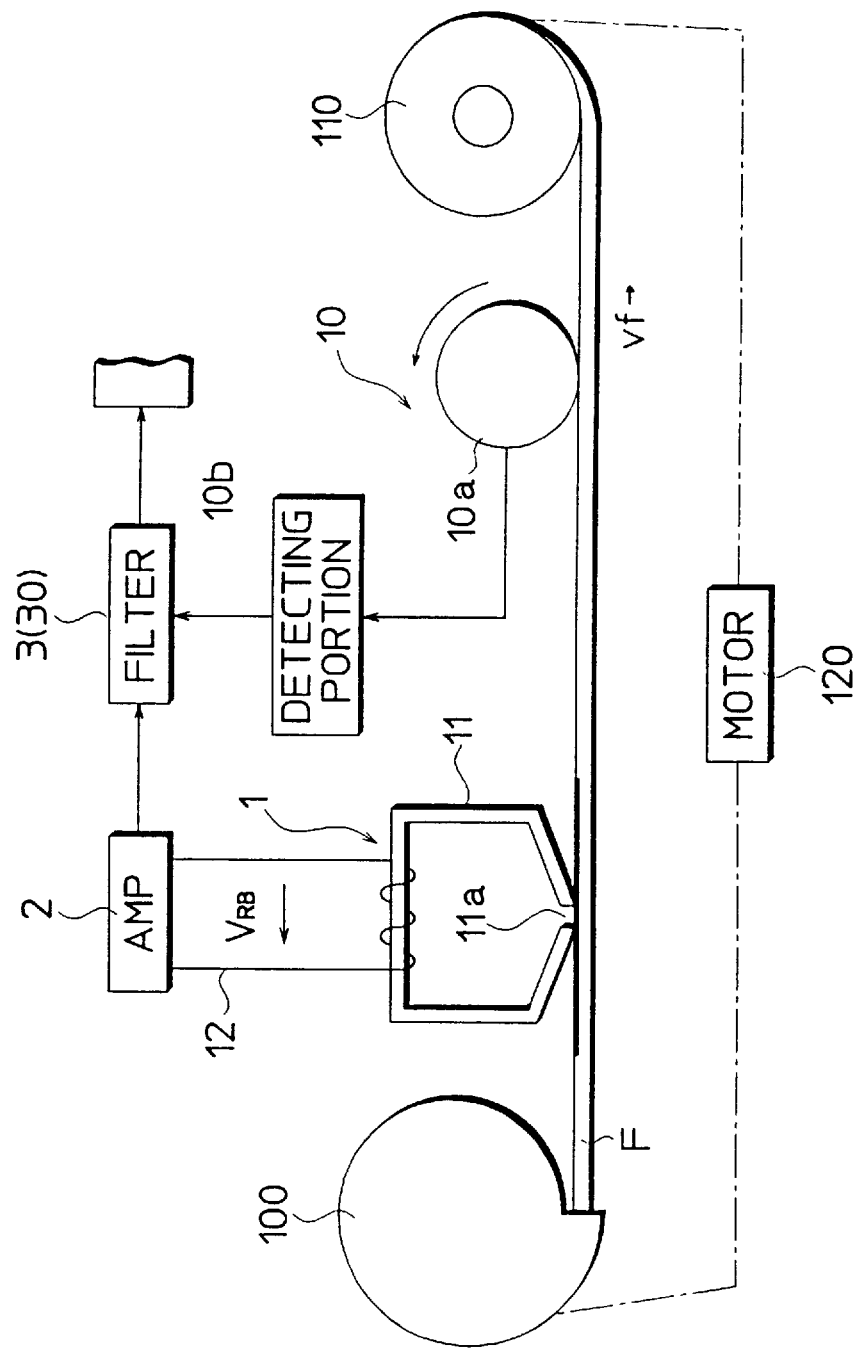
FIG. 3 is a diagram showing a main construction of a data reader including a band-pass filter embodying the invention.
Figure 4:
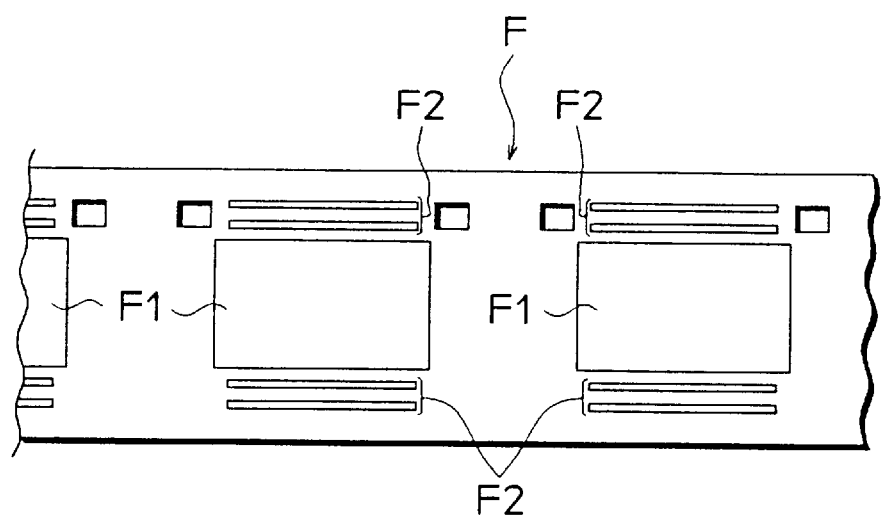
FIG. 4 is a partial diagram showing an exemplary construction of a silver-halide film in which data is magnetically recorded.

FIG. 3 is a diagram showing a circuit construction of a data reader provided in the film image reproducing apparatus 500 and the camera 600. The data reader includes a band-pass filter according to the invention. FIG. 4 is a partial diagram of an exemplary construction of a silver-halide film in which data is magnetically recorded.

A film F includes a plurality of frames F1 arranged at a specified interval in its longitudinal direction, and an object image is recorded in each frame F1. Either above or below or both above and below the respective frames, there are magnetic tracks F2 having a specified width and formed by applying magnetic powder.

Data such as necessary exposure data are written in the magnetic track F2 when the corresponding frame F1 is exposed. The camera 600 capable of writing the exposure data on the film is provided with a magnetic head, and a variety of operation contents, such as data of photographing, are written in the form of a binary bit signal according to a PPM system while the film F is wound by one frame by a film feeder as described later. The exposure data include a plurality of data which are written in a specified order, are so converted as to be represented by a plurality of bits, and are written while the film F is wound.

The exposure data written on the film F are read if necessary. For example, when photographing is to be conducted using a film which was rewound into the cartridge 100 after being used halfway, a first unexposed frame of this film needs to be so set as to face a shutter as an exposure start frame. In this case, since no exposure data are written on the magnetic tracks corresponding to unexposed frames, exposed frames and unexposed frames are discriminated against each other based on the presence of the exposure data in the magnetic tracks of the respective frames.

Exposure data is also read when the photographed film images are to be reproduced on the TV monitor 501 by the film image reproducing apparatus 500. During the feed of the film, film images are optically read and reproduced on the TV monitor 501 after processing is applied to the read film images so that they can be reproduced according to a preferable reproduction method. The reproduction methods include a vertical/horizontal conversion, zooming, panning, color correction, etc.

When the film images are read, the exposure data written on the magnetic tracks F2 are read and reproduced to confirm their contents. The reproduction method is automatically set based on the confirmed contents of the exposure data. The data reader is used both to discriminate the presence of the exposure data and to reproduce the exposure data.

Next, a construction of the data reader will be described with reference to FIG. 3. In FIG. 3, the film cartridge 100 and a take-up pulley 110 provided in the apparatus 500 or the camera 600 are spaced apart by a specified distance. The film cartridge 100 accommodates a roll of film F, and is formed in its center with a rotatable spool around which a base end of the film F is wound. A fittable shaft is fitted over this spool so that a rotational force of a motor 120 provided in the apparatus 500 or the camera 600 is transmitted to the spool via a gear and the fittable shaft to wind the film F. The rotational force of the motor 120 is also transmitted to the take-up pulley 110 via a gear and a fittable shaft so that the take-up pulley 110 rotates in a film winding direction. The feeding direction of the film F may be switched by means of an unillustrated clutch or by controllably switching a rotating direction of the motor 120.

Indicated at 1 is a magnetic head including a ring-shaped core 11 having a partial gap 11a and a coil 12 winding around the core 11. The magnetic head 1 is disposed such that the gap 11a is brought into contact or a specified pressing contact with the surface of the magnetic tracks F2 of the film F. The opposite ends of the coil 12 are connected with an amplifier 2 for outputting a read signal, and a band-pass filter 3 is also connected with a specified circuit required for discrimination of the presence of the exposure data or reproduction of the exposure data as described later. A stationary magnetic flux generated in the gap 11a varies according to the magnetization of the magnetic track F2, and this variation is detected or read in the form of a voltage (a signal voltage $V_{RB}$ shown in FIG. 5B) as described later.

Indicated at 10 is a speed detector for detecting the feeding speed of the film F. The speed detector 10 includes a rotary encoder 10a having an outer surface in contact with the surface of the film F and rotatable in the feeding direction of the film F, and a detecting portion 10b for detecting the feeding speed of the film F based on the cycle of a rotation pulse input from the rotary encoder 10a. The speed detector 10 is unnecessary if the feeding speed of the film F is set in advance as a relative reading speed vf (e.g. minimum and maximum relative reading speed [mm/sec] are set as vf(MIN) and vf(MAX), respectively). The pulse is output from the rotary encoder 10a at a speed corresponding to the feeding speed of the film F, and the detecting portion 10b generates a clock pulse of a cycle corresponding to the feeding speed of the film based on the cycle of the rotation pulse and outputs it to the filter 3. The film feed speed may be obtained by detecting a rotating speed of the motor for feeding the film F by means of a rotary encoder.

Here, binary data obtained according to the PPM system is described with reference to FIG. 5A. A 1-bit data is represented by a rectangular wave having high level "1" and low level "0". For example, if the high level is magnetized in one direction along the magnetic track F2, the low level is magnetized in the opposite direction. Hereafter, a magnetization pattern refers to how the data is magnetized, and a magnetic data refers to a recorded data.

If CLK and DATA denote a fall and a rise of a waveform shown in FIG. 5A, respectively, the level "0" is set such that a rise DATA exists in an area defined between two adjacent falls CLK (hereinafter, "bit cell")and the level "1" is set such that a rise DATA exists behind the bit cell. Further, a pulse position PP[%] refers to the position of the rise DATA when a recording density of the data [bit/mm] is an inverse of a bit cell length $T_{CLK}$ of the magnetic track F2 and the bit cell length $T_{CLK}$ is presented in 100%; a magnetization reversion density FTPM [1/mm] refers to a recording density while the direction of magnetization is reversed; and FTPM(MAX)[1/mm] denotes a maximum magnetization reversion density. Further, BD(MIN), BD(MAX) denote minimum and maximum values of the recording density BD, and $T_{D0}$, $T_{D1}$ denote periods of the levels "0" and "1" corresponding to the pulse position PP.

Figure 5A:
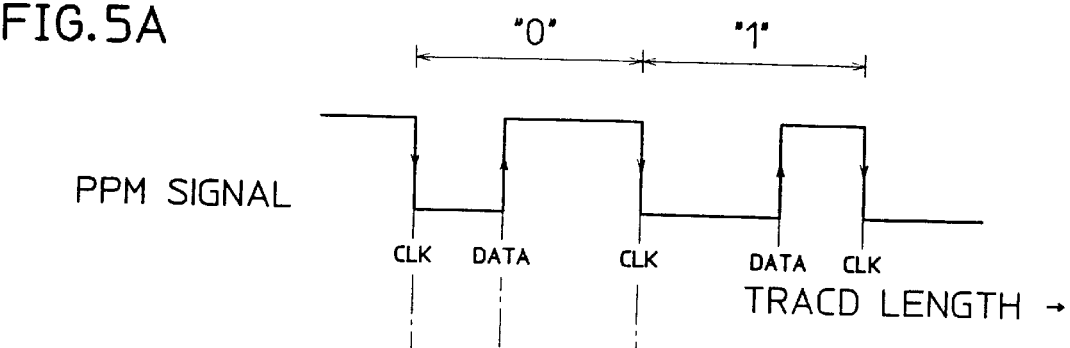
FIGS. 5A to 5D are charts showing waveforms of a PPM signal, a read signal, a differential signal of the read signal, and a shaped signal.
Figure 5B:
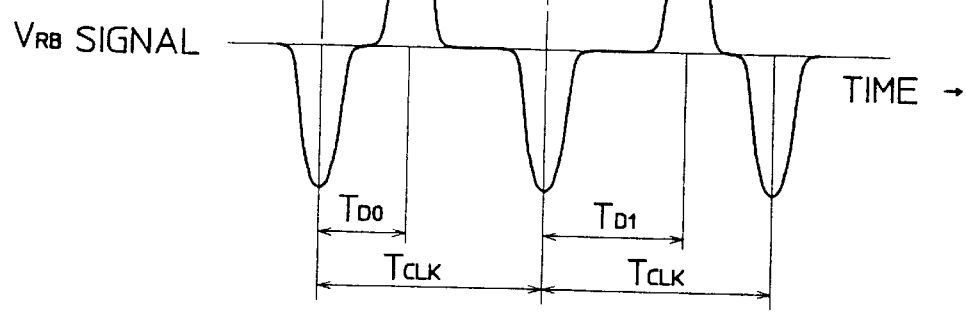

The magnetization pattern shown in FIG. 5A is read as a signal $V_{RB}$ as shown in FIG. 5B. Since the signal $V_{RB}$ is in proportion to a change of the magnetization pattern over time, its waveform is a derivative of the magnetization pattern. The thus obtained signal $V_{RB}$ is processed as described below in a case (A) of discriminating exposed and unexposed frames by detecting the presence of the magnetic data as described above and a case (B) of reproducing the magnetic data.

(A) Case of Detecting the Presence of the Magnetic Data

Figure 6:
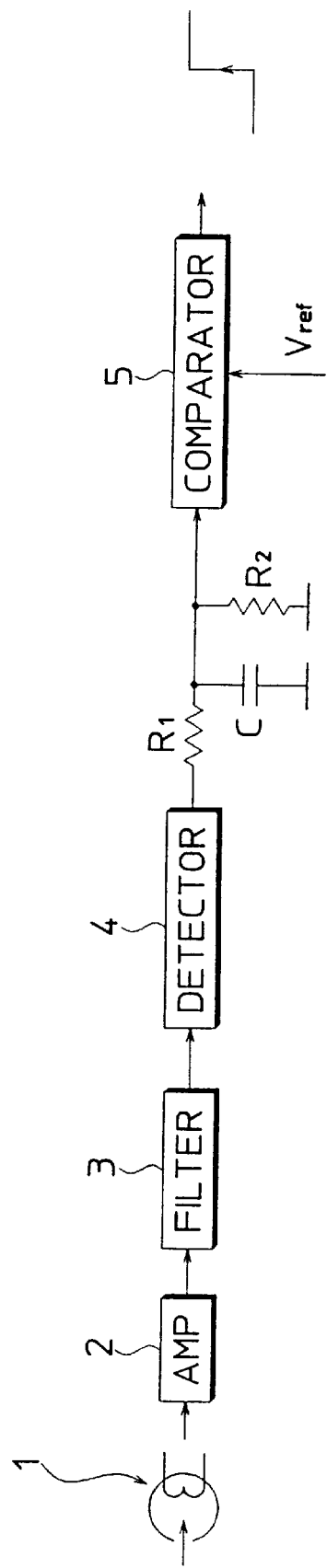
FIG. 6 is a block diagram showing a construction of a circuit for discriminating presence of magnetically recorded data to judge exposed and unexposed frames against each other.

FIG. 6 is a block diagram of a circuit used for the case (A). An amplifier 2 is adapted to amplify the output signal $V_{RB}$ of the magnetic head 1 to a specified level. A filter 3 is adapted to remove noises included in the signal $V_{RB}$ such as external noises picked up by the magnetic head 1, thermal noises generated by the magnetic head 1 itself (head impedance noises) and noises included in the amplifier 2, in order to improve a detection performance. Filtration characteristics of the filter 3 are described later.

A wave detector 4 rectifies the input signal and detects its level. The detector 4 adopts, for example, a diode wave detecting system. Between the wave detector 4 and a comparator 5 is disposed a smoothing circuit including resistors R1, R2 and a capacitor C1. The smoothing circuit smoothes a wave detection signal and generates a pulsating current signal having low frequency components. To the comparator 5 is input a reference signal $V_{ref}$, and outputs a high level if the level of the pulsating current signal is higher than the reference signal $V_{ref}$ while outputting a low level unless otherwise. Accordingly, the output of the comparator 5 changes from low level to high level when the level of the pulsating current signal becomes in excess of that of the reference signal $V_{ref}$. A discrimination as to whether or not the magnetic data is written, i.e., the frame is exposed is made based on this level change.

It is sufficient for the filter 3 to have transmission characteristics good enough to effectively discriminate the presence of the magnetic data. Accordingly, the transmission characteristics may be such that they only cause dominant frequency components of an amplitude information of the input signal to pass through the filter 3 and a waveform distortion can be neglected. In other words, a frequency $f_{CLK0}$ (=$1/T_{CLK}$, hereinafter, a basic frequency) of waves having a relatively large amplitude out of the waveforms of the input signal $V_{RB}$, and frequency components higher than that are not detected.

The basic frequency $f_{CLK0}$ is calculated based on the feeding speed of the magnetic track F2 with respect to the gap 11a of the magnetic head 1, i.e., the relative reading speed vf and the recording density BD in accordance with Equation (1):

$$f_{CLK0}=BD \times vf \qquad (1)$$

Figure 7A:
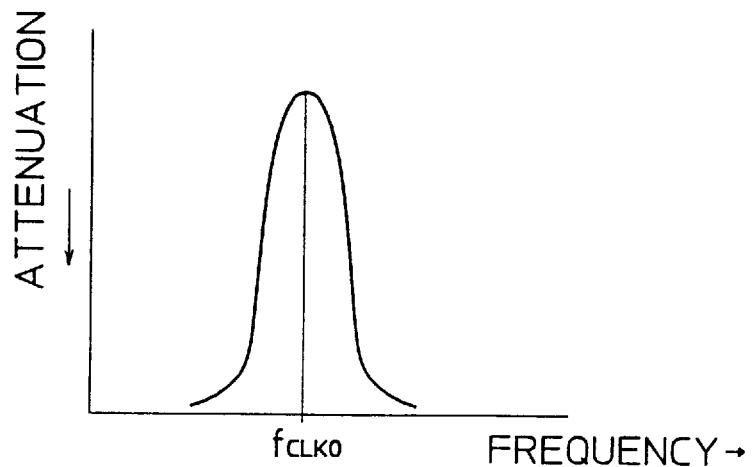
FIGS. 7A and 7B are graphs showing an attenuation in relation to a frequency of waves having a relatively large amplitude among waveforms of an input signal $V_{RB}$, FIG. 7A showing a basic frequency $f_{CLK}$ and FIG. 7B showing frequency band $F_{CLK1}$ to $f_{CLK2}$ in ranges vf(MIN) to vf(MAX), BD(MIN) to BD(MAX)
Figure 7B:
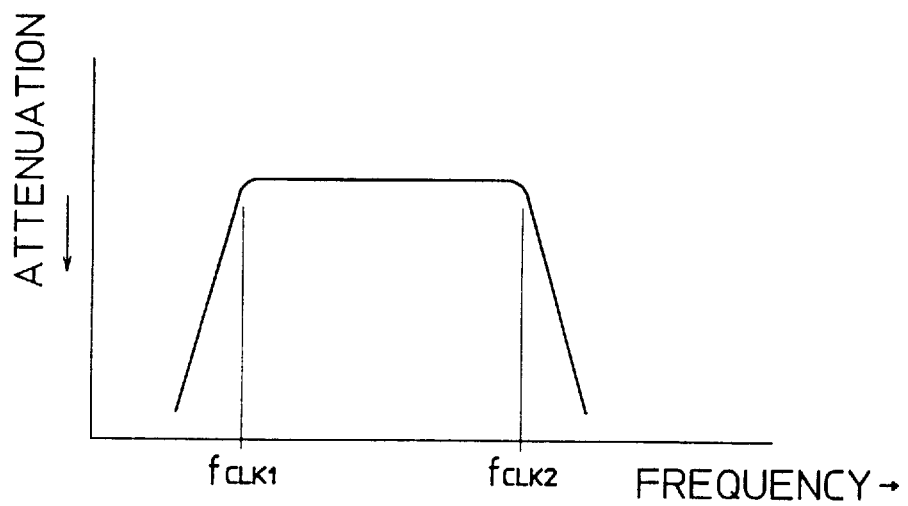

Accordingly, the bandwidth of the filter 3 may be narrow as in FIG. 7A, and noises having frequency components outside this band are cut off, thereby improving a durability against noises. In the case that the relative reading speed vf is set within a predetermined range (vf(MIN) to vf(MAX)) without using the speed detector 10 shown in FIG. 3 and the recording density BD is set within a specified range (BD (MIN) to BD(MAX)), the bandwidth is calculated in accordance with Equation (2), and is determined by $f_{CLK1}$ and $f_{CLK2}$ as shown in FIG. 7B:

$$f_{CLK1}=BD(MIN) \times vf(MIN), f_{CLK2}=BD(MAX) \times vf(MAX) \qquad (2)$$

On the other hand, if the relative reading speed vf is detected by the speed detector 10 as shown in FIG. 3, there may be adopted, as the filter 3, a switched capacitor filter which makes only the frequency shiftable in accordance with a clock pulse input from the detector 10 while keeping the bandwidth as it is or like filter. In this case, since a variation of the relative reading speed vf needs not be considered, the bandwidth (frequency ratio) is $f_{CLK2}/f_{CLK1}$=BD(MAX)/BD(MIN). In comparison with the bandwidth $f_{CLK2}/f_{CLK1}$=BD(MAX)/BD(MIN) as defined in Equation (2), this bandwidth is advantageously narrower.

Figure 8:
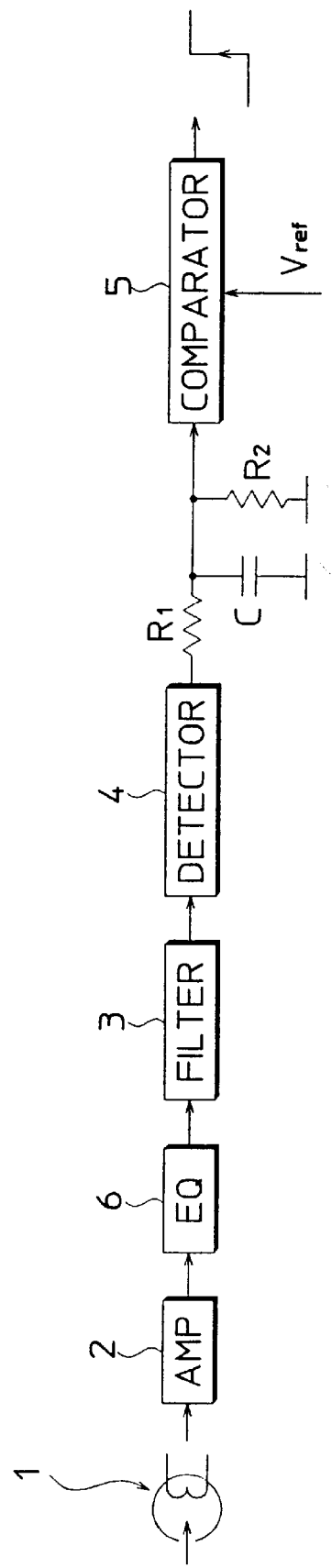
FIG. 8 is a block diagram showing a construction of another circuit for discriminating presence of magnetically recorded data to judge exposed and unexposed frames against each other, the circuit using an equalizer.

FIG. 8 is a block diagram of another circuit adopting an equalizer.

Figure 9:
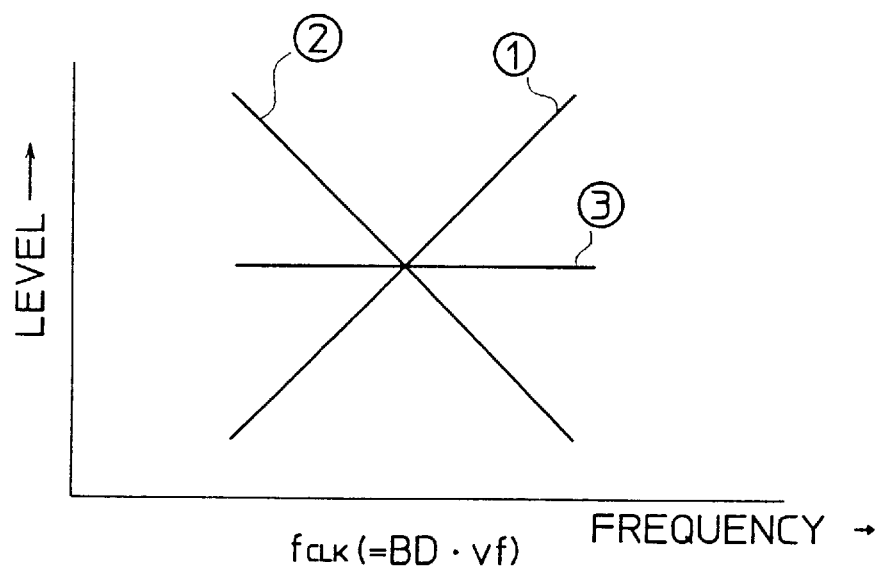
FIG. 9 is a graph showing a combined characteristic of a frequency characteristic of the equalizer and the input signal $V_{RB}$.

In an apparatus wherein the relative reading speed vf and the recording density BD are actively changeable, the amplitude level of the signal $V_{RB}$ is substantially in proportion to a change of the magnetization pattern over time, i.e., $f_{CLK}$ (=BD×vf) as seen in a curve ① of FIG. 9. In order to precisely detect the signal $V_{RB}$ having a largely variable amplitude, it is preferable to apply frequency equalizing.

The equalizer 6 (indicted by EQ) shown in FIG. 8 has a frequency characteristic which is inverse of the curve ①, i.e., offsets the signal $V_{RB}$. By setting the frequency characteristic of the equalizer 6 as seen in a curve ②, a combined characteristic with the signal $V_{RB}$ can be made fixed in relation to the frequency as seen in a curve ③. Accordingly, the signal can be easily detected. Since the waveform of an output of the equalizer 6 is a derivative of the signal $V_{RB}$, the waveform approximate to the original magnetization pattern can be sent to the filter 3 despite the provision of the equalizer 6.

As described above, in the case (A), by determining the bandwidth of the filter 3 on the basis of the reference frequency $f_{CLK0}$ of the signal $V_{RB}$ read by the magnetic head 1, there can be realized signal processing having less influence on the magnetization pattern detection pattern, a good durability against noises, and a high signal-to-noise (S/N) ratio. Further, in consideration of design variations of the actual basic frequency $f_{CLK0}$, low and high band cutoff frequencies $f_{CLK1}$, $f_{CLK2}$, the filter is such that effects similar to the above can be obtained if these actual frequencies fall within ranges which differ from the values obtained in Equations (1) and (2) by ±⅓ octave.

(B) Case of Reproducing the Magnetic Data

Figure 10:
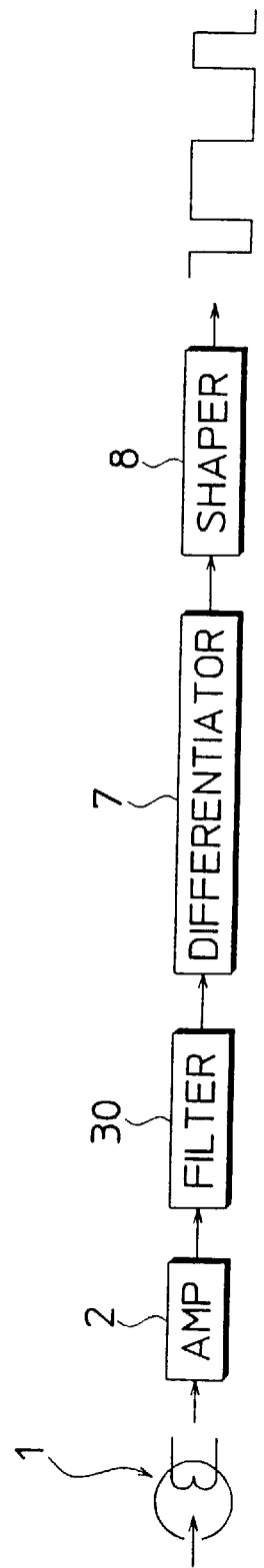
FIG. 10 is a block diagram showing a construction of a circuit for reproducing magnetically recorded data.

FIG. 10 is a block diagram of a circuit adopted in the case (B). This circuit generates a PPM signal identical to the magnetization pattern. Similar to those in FIGS. 6 and 8, an amplifier 2 amplifies an output signal $V_{RB}$ of a magnetic head 1 to a specified level. A filter 30 removes external noises picked up by the magnetic head 1, thermal noises (head impedance noises) generated by the magnetic head itself, noises included in the signal in the amplifier 2, and other noises so as to improve a detection performance, and prevents a waveform distortion to ensure a reproduction performance. The filtration characteristics of the filter 30 is described later.

Figure 5C:
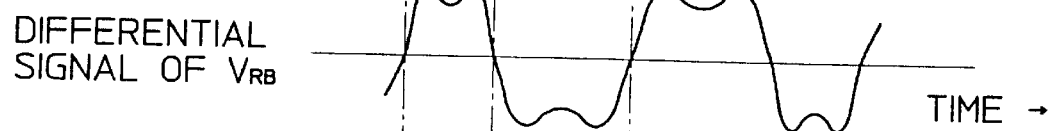
Figure 5D:
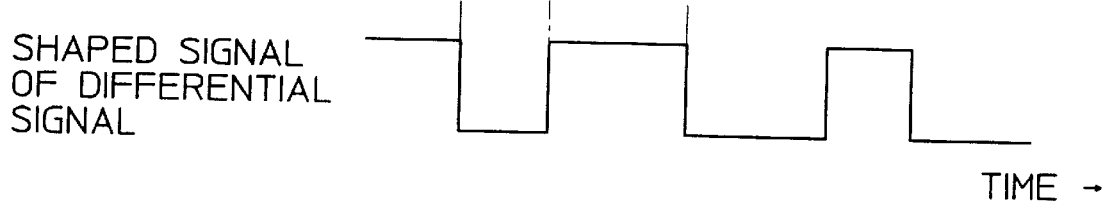

A differentiator 7 applies a differentiation to the signal output from the filter 30. A signal as shown in FIG. 5C can be obtained as a result of this differentiation which is designed to generate a signal in compliance with a differential method generally adopted in reproduction of the magnetic data. In FIG. 5B, an information concerning the positions of the fall CLK and the rise DATA is represented by peaks in negative and positive domains, respectively. Search of such peaks are facilitated by applying the differentiation in the differentiator 7 since the peaks assume zero as shown in FIG. 5C. A waveform shaper 8 shapes the waveform of the signal subjected to the differentiation by means of, e.g. limiting, and inverts outputs the waveform after shaping it. By the processings performed in the differentiator 7 and the waveform shaper 8, the resulting signal is enabled to have substantially the same waveform as that of the original PPM signal as seen in FIGS. 5A and 5D.

FIGS. 11A and 11B are waveform charts showing generation of pseudo peaks by filtration, FIG. 11A showing a waveform of the signal $V_{RB}$ and FIG. 11B showing a waveform thereof after filtering. Since the waveform becomes dull (distorted) after filtering as shown in FIG. 11B, it becomes difficult to precisely locate the peaks on the zero axis, deteriorating an ability to discriminating "0" and "1" of the magnetization pattern and making it likely to generate pseudo peaks PS1, P2 in addition to the normal peaks. This may cause a data detection error. Accordingly, in order to flatten a group delay characteristic, among the transmission characteristics of the filter 30, within the bandwidth, it is preferable to design a filter having, e.g., a Bessel's characteristic (delayed flattening characteristic).

On the other hand, the bandwidth is set as follows. The frequency components of the signal $V_{RB}$ are determined by a product of a spatial frequency of the magnetization pattern and the relative reading speed vf. Assuming that the relative reading speed is fixed, the frequency components of the signal $V_{RB}$ can be obtained if the waveform of the magnetization pattern is checked. More specifically, as seen in FIGS. 5A and 5B, one half of the spatial frequency of the bit cell constituting the magnetization pattern between the fall CLK and the rise DATA (between the former fall CLK and the rise DATA in the data "0" and between the rise DATA and the latter fall CLK in the data "1") is considered to indicate a dominant spatial frequency component of the position information of the rise DATA. Since the maximum recording density between the fall CLK and the rise DATA is a maximum value FTPM(MAX) of the magnetization reversion density of the data recording, one half of this value is equal to a maximum value of the spatial frequency component. As a result, if $f_H$ denotes an upper value of the frequency components of the signal $V_{RB}$, it is calculated in accordance with Equation (3):

$$f_H=(FTPM(MAX)/2) \times vf$$

$$f_2 = f_H \quad (3)$$

On the other hand, the reference frequency $f_L$ is calculated in accordance with Equation (4):

$$f_L = BD \times vf$$

$$f_1 \leq f_L/10 \quad (4)$$

At the high band cutoff frequency $f_2$ of the filter 30, $f_2 = f_H$. On the other hand, the low band cutoff frequency f, is set such that the group delaying characteristic is substantially flat in a frequency range of $f_L$ to $f_H$. Though the low band cutoff frequency $f_1$ differs depending upon the type of the used filter, it is sufficient to substantially satisfy an equation $f_1 \leq f_L/10$.

Even in the case that the relative reading speed vf and the recording density BD have specified ranges as described above, the upper limit value $f_H$ and the reference frequency $f_L$ may be considered to be the maximum relative reading speed vf(MA) and the minimal value of the product of the relative reading speed vf and the recording density BD.

FIG. 12 is a chart showing examples of standards of the recording density BD and the pulse position PP of the bit cell recorded on the magnetic track F2. In FIG. 12, hatched areas are used to represent the data "0" and "1". Line groups a, b in FIG. 12 represent equal magnetization inversion densities FTPM (cases of 120 [1/mm], 125 [1/mm], . . . 200 [1/mm]). A line segment AR indicates an upper limit of the magnetization reversion density FTPM in the data "0", whereas a line segment DT indicates an upper limit of the magnetization reversion density FTPM in the data "1". The magnetization reversion density is 125 FTPM at points A, D and 120 FTPM at points R, T. If the filtering applied in processing the reproduction signal of the magnetization pattern in compliance with the standards is determined on the basis of the high band cutoff frequency $F_2$, the bandwidth can be maximally utilized and the noise removal can be effectively performed.

Because of a relatively high level of a scanning noise of a horizontal synchronization frequency fh ($\approx$15.73 KHz (in the case of the NTSC system),=15.625 KHz (in the case of the PAL system)) of an electron beam of a CRT which noise is generated from a television (NTSC or PAL system), it is desirable to set the high band cutoff frequency $f_2$ of the filter 30 lower than the horizontal synchronization frequency fh if the inventive device is operated near the television. In this case, the maximum value vf(MAX) relative reading speed may be so set as to satisfy the following Equation (5).

$$FTPM(MAX) \times vf(MAX)/2 \leq f_2 < fh \quad (5)$$

In consideration of design variations, the actual low and high band cutoff frequencies $f_1$, $f_2$ may be so set as to differ from values obtained from Equation (11) by $\pm\frac{1}{3}$ octave.

Figure 13:
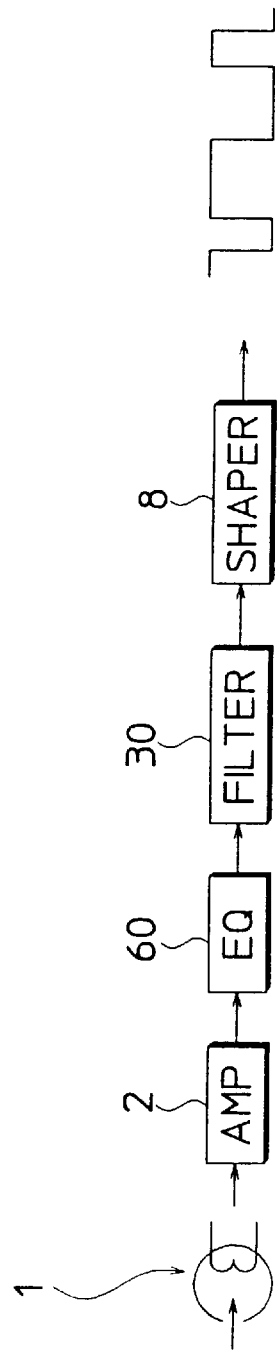
FIG. 13 is a block diagram showing a construction of another circuit for reproducing magnetically recorded data, the circuit using an equalizer.

FIG. 13 is a block diagram of another circuit adopting an equalizer having a waveform equalizing characteristic.

An equalizer 60 (indicated by EQ in FIG. 13) has substantially the same characteristics as the equalizer 6, and is designed such that the waveform of its output signal is further more approximate to that of the original magnetization pattern (see FIG. 5A). In this case, the bandwidth of the filter 30 is determined on the basis of the maximum value FTPM(MAX) of the magnetization reversion density, the relative reading speed vf and the recording density BD as in the case of the differential method.

As described above, in the case (B), the low and high band cutoff frequencies $f_1$, $f_2$ are set on the basis of the maximum value FTPM(MAX) of the magnetization reversion density, the relative reading speed vf and the recording density BD. Accordingly, the signal processing with a good durability against noises and a high S/N ratio can be performed while ensuring a reproduction performance of the magnetization pattern.

Next, design examples of the filter 3 (the case (A)) and the filter 30 (the case (B)) are described.

In the case (A)

In a specific design example, the relative reading speed vf and the recording density BD have the following ranges, respectively. Accordingly, the relative reading speed vf is not detected.

BD(MIN)=5 [bit/mm]

BD(MAX)=44 [bit/mm]

vf(MIN)=50 [mm/sec]

vf(MAX)=200 [mm/sec]

If the respective ranges are set as above, the low and high band cutoff frequencies $f_{CLK1}$, $f_{CLK2}$ can be calculated as in Equation (6) by substituting these values into Equation (2).

$$f_{CLK1}=BD(MIN) \times vf(MIN)=5 \times 50=250 \text{ [Hz]}$$

$$f_{CLK2}=BD(MAX) \times vf(MAX)=44 \times 200=8.8 \text{ [KHz]} \quad (6)$$

Figure 14:
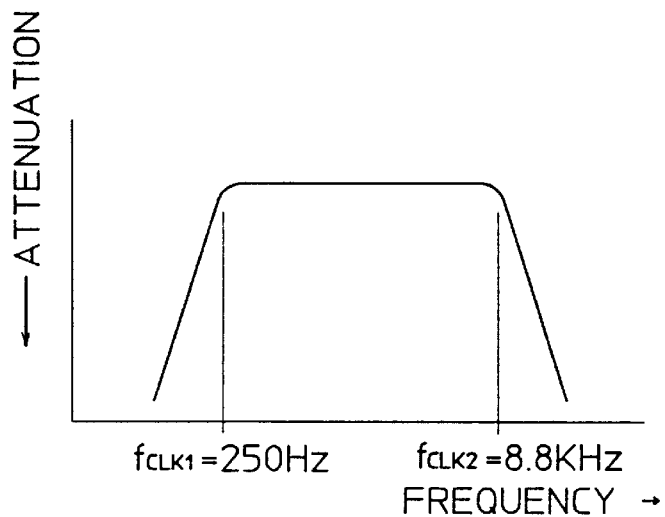
FIG. 14 is a graph showing a characteristic of a filter as one design example in the circuit for discriminating presence of magnetically recorded data.

Thus, as seen in FIG. 14, the filtration characteristics of the filter 3 are: the low band cutoff frequency $f_{CLK1} \approx$250 Hz, and the high band cutoff frequency $f_{CLK2} \approx$8.8 KHz. Further, in order to make the cutoff characteristic steep beyond the pass band as shown in FIG. 14, a band-pass filter may be designed using a butterworth characteristic (amplitude flattening characteristic) or Chebyshev's characteristic (amplitude ripple characteristic).

In the case (B)

The recording density BD is set to have the following range while setting the relative reading speed vf at a constant value, and the maximum value FTPM(MAX) of the data recording density [bit/mm] is set at 125 FTPM as shown in the example of standards in FIG. 12.

vf=100 [mm/sec]

BD(MIN)=5 [bit/mm]

BD(MAX)=44 [bit/mm]

Then, the low and high band cutoff frequencies $f_1$, $f_2$ can be calculated as in Equation (7) by substituting these values into Equations (3) and (4):

$$f_2 = f_H = (125/2) \times 100 = 6.25 \text{ [KHz]} \leq f_h$$

$$f_1 \leq f_L/10 = BD \times vf/10 = 5 \times 100/10 = 50 \text{ [Hz]} \quad (7)$$

Figure 15A:
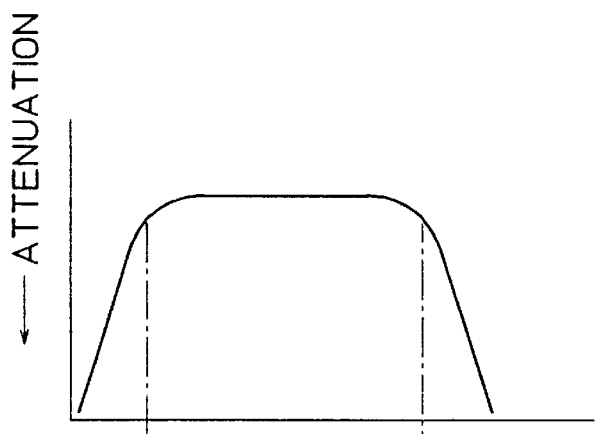
FIGS. 15A and 15B are graphs showing a characteristic of a filter as one design example in the circuit for reproducing magnetically recorded data.
Figure 15B:
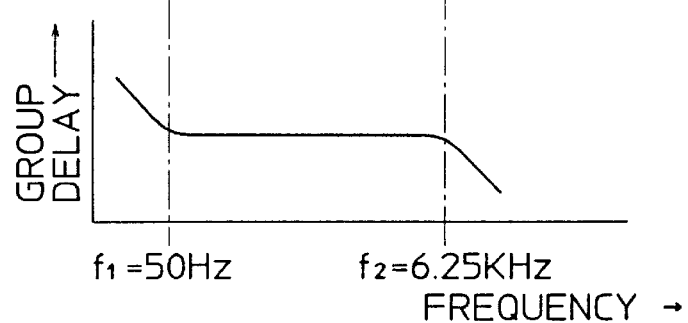

Thus, as seen in FIGS. 15A and 15B, the filtration characteristics of the filter 3 are: the low band cutoff frequency $f_1 = 50$ Hz, and the high band cutoff frequency $f_2 = 6.25$ KHz. Further, in order to make the cutoff characteristic steep beyond the pass band and make the group delay characteristic flat within the pass band as shown in FIGS. 15A and 15B, a band-pass filter may be designed using a Bessel's characteristic.

Although the magnetic head 1 of the type in which the wire is coiled around the ring core is adopted in the foregoing embodiments, an MR device (magnetoresistor) may be adopted as a magnetic head. Similar to the case where the magnetic head 1 of the above type is adopted, the filters 3, 30 may be designed in consideration of the relative reading speed vf and the recording density BD in the case where the presence of the magnetic data is discriminated (case (A)), and in consideration of the maximum value FTPM(MAX) of the magnetization reversion density, the relative reading speed vf and the recording density BD in the case where the magnetic data is reproduced (case (B)).

Further, although the present invention is described with respect to the case where the PPM binary signal is recorded on the magnetic track F2 of the film F in the foregoing embodiments, it may be applied to other materials than films which can be read while a reader and a recording medium are fed with respect to each other. Furthermore, the present invention is applicable to reading of PPM signals which are recorded in other forms than the magnetic form.

Although the present invention has been fully described by way of example with reference to the accompanying drawings, it is to be understood that various changes and modifications re apparent to those skilled in the art. Therefore, unless otherwise such changes and modifications depart from the scope of the present invention, they should be construed as being included therein.

What is claimed is:

1. A filter in combination with a reader which reads pulse position modulation binary data recorded on a record medium by means of relative movement between the reader and the record medium, the filter having a band cutoff frequency that is changeable in accordance with a recording density of data on the record medium and a relative movement speed between the reader and the record medium.

2. A filter as defined in claim 1, wherein the band cutoff frequency includes a low band cutoff frequency which is defined based on a product of a minimum data recording density and a minimum relative movement speed.

3. A filter as defined in claim 1, wherein the band cutoff frequency includes a high band cutoff frequency which is defined based on a product of a maximum data recording density and a maximum relative movement speed.

4. A filter as defined in claim 1, wherein the band cutoff frequency includes a low band cutoff frequency which is defined based on a product of a minimum data recording density and a minimum relative movement speed, and a high band cutoff frequency which is defined based on a product of a maximum data recording density and a maximum relative movement speed.

5. A filter as defined in claim 1, wherein the band cutoff frequency includes a band cutoff frequency falling within a range of ±⅓ octave of a product of a data recording density and a relative movement speed.

6. A filter as defined in claim 5, wherein the band cutoff frequency includes a low band cutoff frequency which is defined based on a product of a minimum data recording density and a minimum relative movement speed.

7. A filter as defined in claim 5, wherein the band cutoff frequency includes a high band cutoff frequency which is defined based on a product of a maximum data recording density and a maximum relative movement speed.

8. A filter as defined in claim 5, wherein the band cutoff frequency includes a low band cutoff frequency which is defined based on a product of a minimum data recording density and a minimum relative movement speed, and a high band cutoff frequency which is defined based on a product of a maximum data recording density and a maximum relative movement speed.

9. A filter in combination with a reader which reads pulse position modulation binary data recorded on a record medium by means of relative movement between the reader and the record medium, the filter having a band cutoff frequency that is changeable in accordance with the relative movement speed between the reader and the record medium when executing a reading operation and one of a recording density of data on the record medium and a magnetization reversion density.

10. A filter as defined in claim 9, wherein the band cutoff frequency includes a low band cutoff frequency which is defined based on a product of a minimum data recording density and a minimum relative movement speed.

11. A filter as defined in claim 10, wherein the band cutoff frequency includes a low band cutoff frequency which is defined based on one tenth of a product of a minimum data recording density and a minimum relative movement speed.

12. A filter as defined in claim 9, wherein the band cutoff frequency includes a high band cutoff frequency which is defined based on a product of a maximum magnetization reversion density and a maximum relative movement speed.

13. A filter as defined in claim 12, wherein the band cutoff frequency includes a high band cutoff frequency which is defined based on one half of a product of a maximum magnetization reversion density and a maximum relative movement speed.

14. A filter as defined in claim 9, wherein the band cutoff frequency includes a low band cutoff frequency which is defined based on a product of a minimum data recording density and a minimum relative movement speed, and a high band cutoff frequency which is defined based on a product of a maximum magnetization reversion density and a maximum relative movement speed.

15. A filter as defined in claim 9, wherein the band cutoff frequency includes a band cutoff frequency falling within a range of ±⅓ octave of a given value.

16. A filter as defined in claim 15, wherein the band cutoff frequency includes a low band cutoff frequency which is defined based on a product of a minimum data recording density and a minimum relative movement speed.

17. A filter as defined in claim 18, wherein the band cutoff frequency includes a low band cutoff frequency which is defined based on one tenth of a product of a minimum data recording density and a minimum relative movement speed.

18. A filter as defined in claim 15, wherein the band cutoff frequency includes a high band cutoff frequency which is defined based on a product of a maximum magnetization reversion density and a maximum relative movement speed.

19. A filter as defined in claim 18, wherein the band cutoff frequency includes a high band cutoff frequency which is defined based on one half of a product of a maximum magnetization reversion density and a maximum relative movement speed.

20. A filter as defined in claim 15, wherein the band cutoff frequency includes a low band cutoff frequency which is defined based on a product of a minimum data recording density and a minimum relative movement speed, and a high band cutoff frequency which is defined based on a product of a maximum magnetization reversion density and a maximum relative movement speed.

21. A filtering system for use with a reader for reading pulse position modulation binary data recorded on a record medium in a relative movement to the record medium, the filtering system comprising:

a filter which filters pulse position modulation binary data;
 a detector which detects a relative movement speed between the reader and the record medium; and
 a setter which sets a band cutoff frequency of the filter in accordance with a detected relative movement speed.

22. A filtering system as defined in claim 21, wherein the band cutoff frequency includes a low band cutoff frequency which is defined based on a minimum data recording density and a high band cutoff frequency which is defined based on a maximum data recording density.

23. A filtering system as defined in claim 22, wherein the setter sets a band cutoff frequency falling within a range of ±⅓ octave of a given value.

24. A filter in combination with a reader which reads pulse position modulation binary data recorded on a record medium by means of relative movement between the reader and the recording medium, and a television having a specified horizontal synchronization frequency, the filter having a high band cutoff frequency lower than the specified horizontal synchronization frequency.

25. A filter as defined in claim 24, wherein the high band cutoff frequency is higher than one half of a product of a maximum magnetization reversion density and a maximum relative movement speed.

26. A filter as defined in claim 25, wherein the filter having a band cutoff frequency falling within a range of ±⅓ octave of a given value.

27. A device capable of reading pulse position modulation binary data recorded on a record medium, the device comprising:

a reading head which reads recorded data to produce a read signal;
 a driver which causes a relative movement between the record medium and the reading head;
 a filtering circuit which filters a signal having a specified band frequency from the read signal; and
 a controller which sets a band cutoff frequency of the filtering circuit based on a recording density of data on the record medium and a relative movement speed between the record medium and the reading head.

28. A device as defined in claim 27, wherein the controller sets a low band cutoff frequency based on a product of a minimum data recording density and a minimum relative movement speed.

29. A device as defined in claim 27, wherein the controller sets a high band cutoff frequency based on a product of a maximum data recording density and a maximum relative movement speed.

30. A device as defined in claim 27, wherein the controller sets a low band cutoff frequency based on a product of a minimum data recording density and a minimum relative movement speed, and a high band cutoff frequency based on a product of a maximum data recording density and a maximum relative movement speed.

31. A device capable of reading pulse position modulation binary data recorded on a photographic film having a magnetic recording portion, the device comprising:

a reading head which reads recorded data to produce a read signal;
 a driver which produces relative movement between the film and the reading head;
 a filtering circuit which filters a signal having a specified band frequency from the read signal; and
 a controller which sets a band cutoff frequency of the filtering circuit based on a recording density of data on the magnetic portion of the film and relative movement speed between the film and the reading head.

32. A camera capable of reading pulse position modulation binary data recorded on a record medium, the camera including:

a reading head which reads recorded data to produce a read signal;
 a driver which produces relative movement between the record medium and the reading head;
 a filtering circuit which filters a signal having a specified band frequency from the read signal; and
 a controller which sets a band cutoff frequency of the filtering circuit based on a recording density of data on the record medium and a relative movement speed between the record medium and the reading head.

33. An image reproducing apparatus capable of reading pulse position modulation binary data recorded on a record medium, the image reproducing apparatus including:

a reading head which reads recorded data to produce a read signal;
 a driver which produces relative movement between the record medium and the reading head;
 a filtering circuit which filters a signal having a specified band frequency from the read signal; and
 a controller which sets a band cutoff frequency of the filtering circuit based on a recording density of data on the record medium and a relative movement speed between the record medium and the reading head.

\* \* \* \* \*